(12) United States Patent
Andry et al.

(10) Patent No.: US 8,855,452 B2
(45) Date of Patent: Oct. 7, 2014

(54) SILICON PHOTONIC CHIP OPTICAL COUPLING STRUCTURES

(75) Inventors: Paul S. Andry, Yorktown Heights, NY (US); Russell A. Budd, North Salem, NY (US); Frank R. Libsch, White Plains, NY (US); Robert L. Wisnieff, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/353,118

(22) Filed: Jan. 18, 2012

(65) Prior Publication Data

US 2013/0182998 A1    Jul. 18, 2013

(51) Int. Cl.
*G02B 6/34* (2006.01)
*G02B 6/12* (2006.01)

(52) U.S. Cl.
USPC .......................................................... 385/33

(58) Field of Classification Search
CPC ........... G02B 6/34; G02B 6/12; G02B 6/1225
USPC ........................................ 385/14, 33, 37, 88
See application file for complete search history.

(56) References Cited

U.S. PATENT DOCUMENTS

| 5,600,741 | A | 2/1997 | Hauer et al. |
| 6,609,835 | B2 | 8/2003 | Trezza et al. |
| 6,650,817 | B2 | 11/2003 | Murali |
| 6,788,836 | B2 | 9/2004 | Murali |
| 6,869,882 | B2 | 3/2005 | Murali |
| 7,340,120 | B2 | 3/2008 | McFarland et al. |
| RE40,416 | E | 7/2008 | Jian |
| 7,427,804 | B2 | 9/2008 | Yamada et al. |
| 7,466,880 | B2 | 12/2008 | Windover |
| 8,280,207 | B2 | 10/2012 | Pinguet et al. |
| 2003/0210865 | A1 | 11/2003 | Johannessen |
| 2006/0239612 | A1* | 10/2006 | De Dobbelaere et al. ...... 385/37 |
| 2009/0297094 | A1* | 12/2009 | Hochberg et al. ............... 385/14 |
| 2010/0111473 | A1 | 5/2010 | Pinguet et al. |
| 2010/0322551 | A1 | 12/2010 | Budd et al. |
| 2011/0278441 | A1* | 11/2011 | Vermeulen et al. ...... 250/227.23 |

FOREIGN PATENT DOCUMENTS

| CN | 1251660 A | 4/2000 |
| EP | 1115012 A1 | 7/2001 |
| EP | 1189087 A2 | 3/2002 |
| TW | 201028748 A1 | 8/2010 |

OTHER PUBLICATIONS

Dellman et al., "Butt-Coupled Optoelectronic Modules for High-Speed Optical Interconnects," Proc. CLEO/Europe-EQEC 2005, IEEE Conference on Lasers and Electro-Optics Europe Cat. No. 05TH8795, p. 476, Munich, 2005.

* cited by examiner

*Primary Examiner* — Charlie Peng
*Assistant Examiner* — Mary El Shammaa
(74) *Attorney, Agent, or Firm* — Yee & Associates, P.C.; Anne Dougherty

(57) ABSTRACT

A silicon photonic chip is provided. An active silicon layer that includes a photonic device is on a front side of the silicon photonic chip. A silicon substrate that includes an etched backside cavity is on a backside of the silicon photonic chip. A microlens is integrated into the etched backside cavity. A buried oxide layer is located between the active silicon layer and the silicon substrate. The buried oxide layer is an etch stop for the etched backside cavity.

23 Claims, 4 Drawing Sheets

SILICON PHOTONIC CHIP OPTICAL COUPLING STRUCTURES

BACKGROUND

1. Field

The disclosure relates generally to integrated circuits, silicon chip technology and more specifically to coupling of optical signals to and from a silicon photonic chip.

2. Description of the Related Art

The communication bandwidth between computers and within a computer is playing an increasing role in a system's overall performance. The trend towards multi-core processors and multiple processors per computer requires an increase in communication between processors and between a processor and its memory. Electrical data links perform well over short distances, but electrical data links reach a limit as the link distance and frequency increases. Optical data links over optical fiber are capable of high speed communication with low transmission loss over long distances. However, silicon photonic chips are expensive compared with their electrical counterparts.

Silicon (Si) photonics is a technology that is under worldwide research and development due to its promise of delivering high performance optical components built in silicon chip technologies. Silicon photonic is the study and application of photonic systems that use silicon as an optical medium. The silicon is patterned with sub-micrometer precision into silicon photonic structures. The silicon typically lies on top of a layer of silica in what is known as silicon-on-insulator (SOI).

SUMMARY

According to one embodiment of the present invention, a silicon photonic chip with an integrated microlens within an etched backside cavity is provided. An active silicon layer that includes a photonic device is on a front side of the silicon photonic chip. A silicon substrate that includes an etched backside cavity is on a backside of the silicon photonic chip. A microlens is integrated into the etched backside cavity. A buried oxide layer is located between the active silicon layer and the silicon substrate. The buried oxide layer is an etch stop for the etched backside cavity.

DETAILED DESCRIPTION

With reference now to the figures, and in particular, with reference to FIGS. 1-4, diagrams of apparatuses are provided in which illustrative embodiments may be implemented. It should be appreciated that FIGS. 1-4 are only meant as examples and are not intended to assert or imply any limitation with regard to the apparatuses in which different embodiments may be implemented. Many modifications to the depicted apparatuses may be made. In addition, it should be noted that the various features of the figures are not to scale. On the contrary, the dimensions of the various features are arbitrarily expanded or reduced for clarity.

Figure 1:
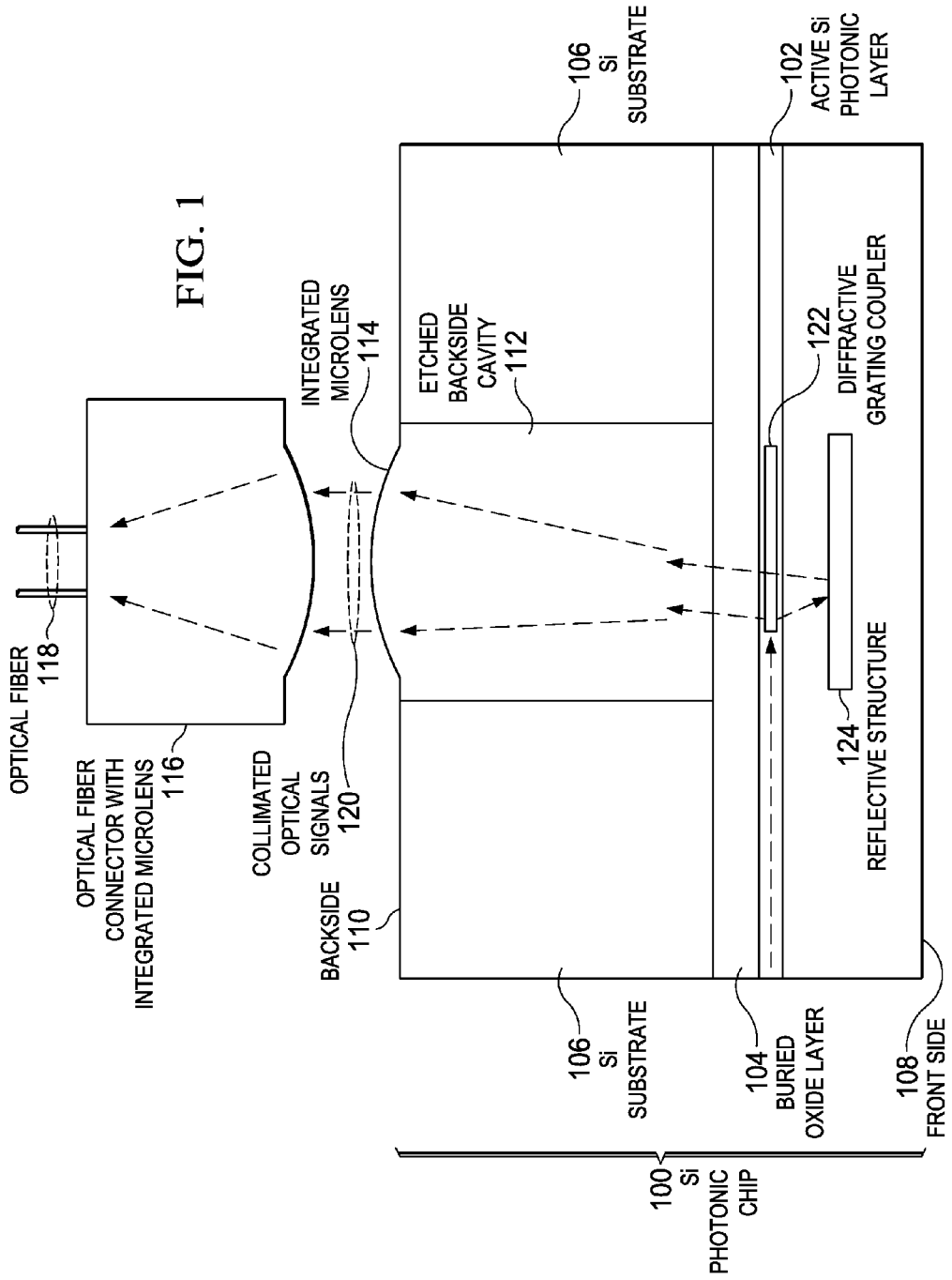
FIG. 1 is a diagram of a cross-section view of a silicon photonic chip with integrated microlens in an etched backside cavity in accordance with an illustrative embodiment.

FIG. 1 depicts a diagram of a cross-section view of a silicon photonic chip with integrated microlens in an etched backside cavity in accordance with an illustrative embodiment. Silicon photonic chip 100 is an example of a semiconductor chip that may be used in a data processing system, such as a computer. In addition, silicon photonic chip 100 is capable of transmitting and receiving optical signals (i.e., pulses of light), which are used to communicate data. In other words, silicon photonic chip 100 is an optical transceiver device. Silicon photonic chip 100 includes active silicon photonic layer 102, buried oxide layer 104, and silicon substrate 106.

Active silicon photonic layer 102 is on front side 108 of silicon photonic chip 100. Active silicon photonic layer 102 transports the optical signals or pulses of light and includes silicon photonic devices, which are essentially transparent to the optical signals at a wavelength of approximately 1 to 1.6 micrometers. Active silicon photonic layer 102 is typically 150-300 nanometers in thickness and is approximately 500-1000 nanometers wide. In addition, active silicon photonic layer 102 may also include electronic devices. However, it should be noted that active silicon photonic layer 102 may include both photonic devices and electronic devices or may include only photonic devices.

The photonic devices (i.e., silicon optical structures) are fabricated within active silicon photonic layer 102. A photonic device is any optical structure fabricated in active silicon photonic layer 102 that guides, generates, manipulates, or detects the pulses of light. Examples of photonic devices are lasers, optical modulators, photodetectors, and optical switches, with silicon optical waveguides used to transport the optical signals to and from the photonic devices. In addition, active silicon photonic layer 102 may also include fabricated electronic devices, along with the photonic devices. Examples of electronic devices that may be included in active silicon photonic layer 102 are transistors, capacitors, resistors, and inductors. A standard fabrication process for these photonic and electronic devices is a complementary metal oxide-semiconductor (CMOS) process.

Buried oxide layer 104 of silicon photonic chip 100 is buried between active silicon photonic layer 102 and silicon substrate 106. Buried oxide layer 104 may, for example, be comprised of silicon dioxide ($SiO_2$) material. Typically, buried oxide layer 104 is greater than or equal to one to two micrometers in thickness.

Silicon substrate 106 is on backside 110 of silicon photonic chip 100. Silicon substrate 106 is a bulk silicon layer that provides support for silicon photonic chip 100. Typically, silicon substrate 106 is greater than or equal to 300 micrometers.

In the course of developing illustrative embodiments, it was discovered that the optical signal interconnection between a silicon photonic chip and an optical fiber, such as optical fiber 118, is costly and requires tight optical alignment tolerances. Typically, a diffractive grating coupler, such as diffractive grating coupler 122, along with a reflective structure, such as reflective structure 124, were used to direct optical signals to and from the active silicon photonic layer to and from the optical fiber. In this typical case, the optical fiber must be optically aligned to the diffractive grating coupler to within one micrometer and then bonded in place. This tight optical alignment between the optical fiber and the diffractive grating coupler requires precision tooling and, thus, is expensive. Furthermore, once the optical fiber is bonded in place, the silicon photonic chip and the optical fiber cannot be separated. As a result, this bonding of the optical fiber to the silicon photonic chip limits subsequent packaging options of the silicon photonic chip assembly. For example, if during handling of the silicon photonic chip assembly the optical fiber is damaged, then the entire silicon photonic chip/optical fiber assembly may need to be replaced. However, illustrative embodiments obtain an increased number of packaging options utilizing remake-able silicon photonic chip to optical fiber coupling structures.

Illustrative embodiments simplify and lower the cost of the silicon photonic chip to optical fiber coupling by integrating optical coupling structures on the silicon photonic chip using a wafer scale packaging technology, thereby simplifying the optical coupling of components and lowering the overall manufacturing cost. Illustrative embodiments illustrate this new approach by forming etched backside cavity 112 in silicon substrate 106. Etched backside cavity 112 is formed in silicon substrate 106 by removing the silicon substrate at selected sites. Etched backside cavity 112 may, for example, be cylindrical in shape. The selective silicon substrate removal is performed by, for example, using a photolithography process on backside 110 of silicon photonic chip 100 followed by chemical etching.

Removing silicon substrate 106 at the selected sites exposes a backside surface of buried oxide layer 104. Illustrative embodiments utilize buried oxide layer 104 as a built-in etch stop for complete removal of the silicon substrate at the selected sites, such as etched backside cavity 112. Etched backside cavity 112 represents an array of etched backside cavities. The array of etched backside cavities may, for example, be a 1×N, 2×N, 3×N, 4×N, or N×N array of etched backside cavities, where N represents a positive whole number.

Etched backside cavity 112 is located under a photonic device, such as diffractive grating coupler 122, in active silicon photonic layer 102 of silicon photonic chip 100. Similar to etched backside cavity 112, diffractive grating coupler 122 represents an array of photonic devices within active silicon photonic layer 102. The array of photonic devices may, for example, be a 1×N, 2×N, 3×N, 4×N, or N×N array of photonic devices. Also, it should be noted that the number of photonic devices in the array of photonic devices may or may not be equal to the number of etched backside cavities in the array of etched backside cavities.

An ultraviolet curable optical polymer material may be used to fill etched backside cavity 112. An example, of an ultraviolet curable optical polymer material used to fill etched backside cavity 112 may, for example, be an optical adhesive, such as Norland Optical Adhesive #NOA 88. Alternatively, etched backside cavity 112 may be filled with a silicon dioxide material. Either the optical polymer material or the silicon dioxide material in etched backside cavity 112 may be formed into integrated microlens 114. For example, excess optical polymer material within etched backside cavity 112 may protrude beyond backside 110 of silicon substrate 106. Then, a transparent, lens-shaped mold is placed above silicon substrate 106 and optically aligned with diffractive grating coupler 122 using an optical alignment device during manufacturing of silicon photonic chip 100. The optical alignment device looks through the transparent, lens-shaped mold to align the transparent, lens-shaped mold with diffractive grating coupler 122. This alignment of the transparent, lens-shaped mold with diffractive grating coupler 122 may be less than one micrometer. In other words, the optical signal misalignment tolerance between integrated microlens 114 and diffractive grating coupler 122 is less than one micrometer. After alignment, an ultraviolet (UV) light is used to cure the optical polymer material within etched backside cavity 112 and within the transparent, lens-shaped mold. As a result, integrated microlens 114 is formed, which is in alignment with diffractive grating coupler 122.

It should be noted that even though integrated microlens 114 is shown to extend beyond backside 110 of silicon substrate 106 in the example of FIG. 1, illustrative embodiments are not limited to such. For example, integrated microlens 114 may be recessed within etched backside cavity 112 below backside 110. One reason to recess integrated microlens 114 within etched backside cavity 112 is to protect integrated microlens 114 from damage.

Also it should be noted that the transparent lens-shaped mold may be fabricated to cover an entire silicon photonic wafer. Consequently, the transparent lens-shaped mold to silicon photonic wafer alignment may be performed across the entire silicon photonic wafer during the manufacturing process, realizing a wafer scale alignment between the array of integrated lenses 114 and the array of diffractive grating coupler 122. This wafer scale alignment leads to a lower fabrication cost per silicon photonic chip.

Diffractive grating coupler 122 is a microlithographically fabricated structure in active silicon photonic layer 102 that is designed to diffract optical signals to and from silicon photonic devices within active silicon photonic layer 102. One benefit of using diffractive grating coupler 122 is that diffractive grating coupler 122 may perform a plurality of optical operations simultaneously. Reflective structure 124 is an optical structure located within front side 108 of silicon photonic chip 100. Reflective structure 124 is designed to reflect optical signals. Reflective structure 124 may, for example, be a mirror or one or more layers of thin metal film. Also, it should be noted that even though in this example of FIG. 1 a combination of reflective and diffractive structures are used in silicon photonic chip 100, alternative illustrative embodiments may use only reflective structures or may use only diffractive structures in silicon photonic chip 100.

As noted above, active silicon photonic layer 102 transports optical signals. These optical signals are diffracted out of plane with active silicon photonic layer 102 by diffractive grating coupler 122. Reflective structure 124 reflects optical signals diffracted toward front side 108 of silicon photonic chip 100. As a result, most, if not all, of the optical signals are directed through etched backside cavity 112 within silicon substrate 106. At backside 110 of silicon substrate 106, integrated microlens 114 is positioned to collimate or nearly collimate the optical signals from diffractive grating coupler 122 and reflective structure 124. Typically, the mode field diameter of the optical signals at diffractive grating coupler 122 is approximately 8-10 micrometers. As the optical signals progress through etched backside cavity 112, the optical signals expand to a mode field diameter of approximately 100 micrometers. Integrated microlens 114 collimates or focuses optical signals 120 to optical fiber connector with integrated microlens 116. Collimated optical signals 120 is a plurality of parallel pulses of light that spread slowly as they propagate. Optical fiber connector with integrated microlens 116 is connected to optical fiber 118.

Figure 3:
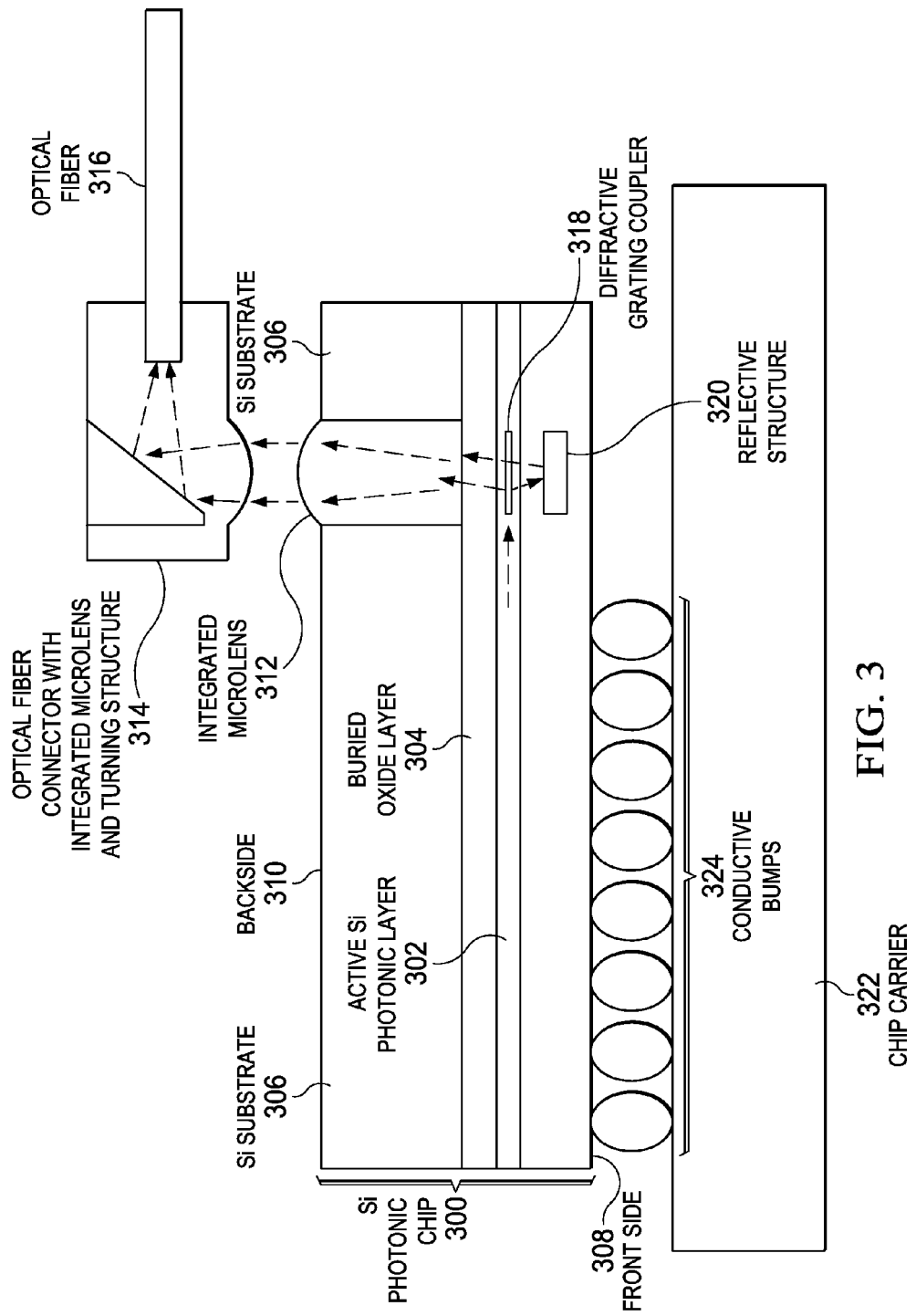
FIG. 3 is a diagram of a cross-section view of a silicon photonic chip with integrated microlens optically coupled to an optical fiber connector with integrated microlens in accordance with an illustrative embodiment.

Illustrative embodiments address the requirements of single mode silicon photonic packaging and the ability to precisely align integrated microlens 114 by using an optical alignment device to look though integrated microlens 114 at the photonic devices, such as diffractive grating coupler 122, and/or the electronic devices within active silicon photonic layer 102 to realize a sub micron lens alignment. Further, it should be noted that even though in this example of FIG. 1 a straight optical fiber connector to optical fiber arrangement above the silicon photonic chip is illustrated, other optical fiber connector arrangements are possible, such as illustrated in the example of FIG. 3, which shows a right angle optical signal turning structure positioned within the optical fiber connector.

Figure 2:
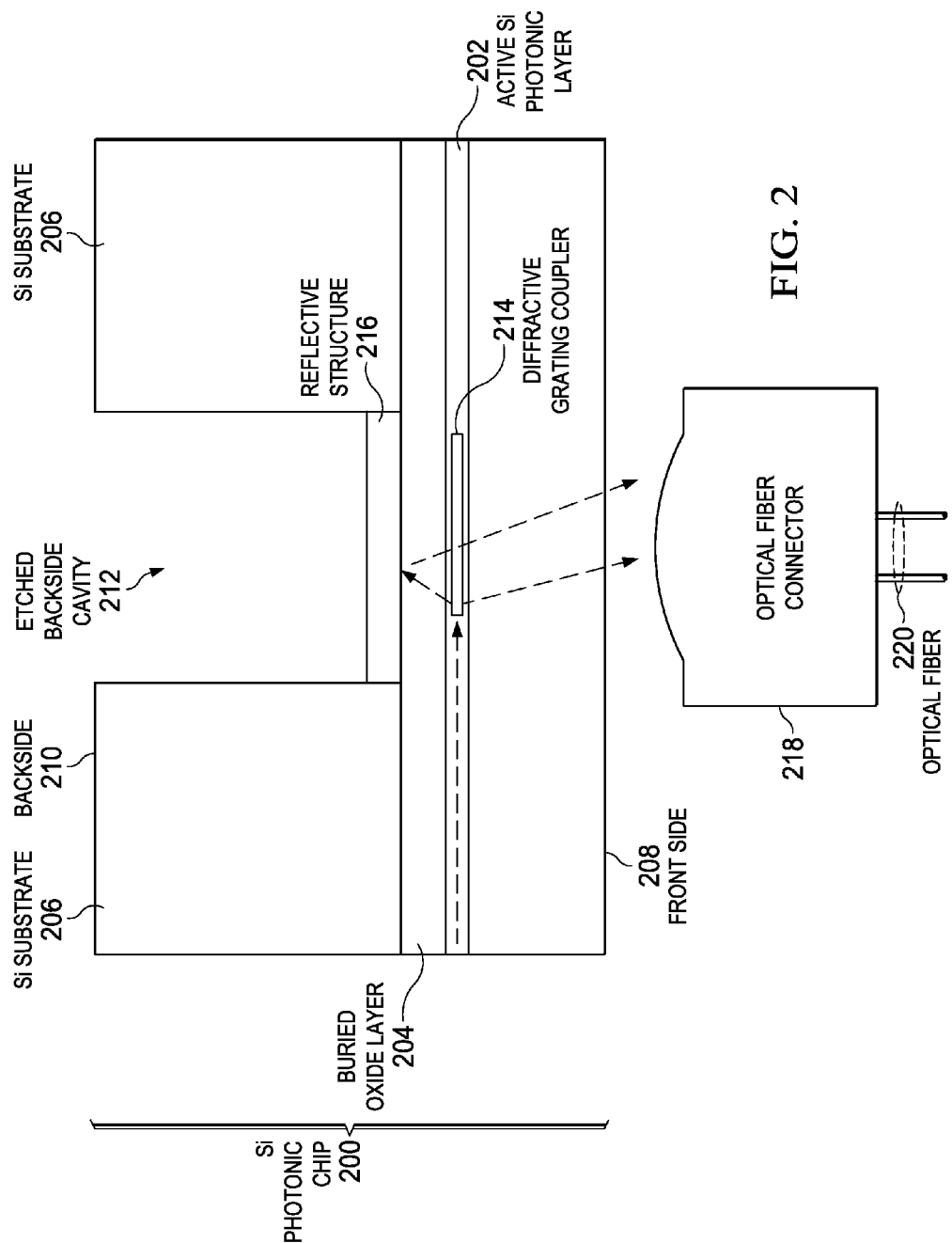
FIG. 2 is a diagram of a cross-section view of a silicon photonic chip with a reflective structure located in an etched backside cavity in accordance with an illustrative embodiment.

With reference now to FIG. 2, a diagram of a cross-section view of a silicon photonic chip with a reflective structure located in an etched backside cavity is depicted in accordance with an illustrative embodiment. Silicon photonic chip 200 is similar to silicon photonic chip 100 in FIG. 1. For example, silicon photonic chip 200 includes active silicon photonic layer 202, buried oxide layer 204, and silicon substrate 206, such as active silicon photonic layer 102, buried oxide layer 104, and silicon substrate 106 in FIG. 1.

Active silicon photonic layer 202 is on front side 208 of silicon photonic chip 200. Active silicon photonic layer 202 includes silicon photonic devices, such as diffractive grating coupler 214, and may also include electronic devices. Buried oxide layer 204 is buried between active silicon photonic layer 202 and silicon substrate 206. Silicon substrate 206 is on backside 210 of silicon photonic chip 200.

In addition, silicon photonic chip 200 includes etched backside cavity 212 and reflective structure 216, such as etched backside cavity 112 and reflective structure 124 in FIG. 1. However, in this example of FIG. 2, it should be noted that reflective structure 216 is located on backside 210 of silicon photonic chip 200 within etched backside cavity 212 adjacent to a backside surface of buried oxide layer 204. In the example of FIG. 1, reflective structure 124 is located on front side 108 of silicon photonic chip 100 to reflect or redirect optical signals through silicon substrate 106 to a backside optical coupling structure, such as optical fiber connector with integrated microlens 116. However, in the course of developing the illustrative embodiments it was discovered that in some silicon photonic chip packaging scenarios it was desirable to couple optical signals from the silicon photonic chip to a front side optical coupling structure, such as optical fiber connector 218. It should be noted that in this example of FIG. 2, optical fiber connector 218 includes an integrated microlens. However, illustrative embodiments are not limited to such. In other words, in alternative illustrative embodiments, optical fiber connector 218 may not include an integrated microlens. Optical fiber connector 218 is connected to optical fiber 220.

Reflective structure 216 may, for example, be a metal mirror or one or more layers of thin metal film. Also, as an optional manufacturing step, etched backside cavity 212 within silicon substrate 206 may be back-filled with a material, such as silicon dioxide or other material, to protect reflective structure 216. Reflective structure 216 is advantageous in that reflective structure 216 improves directional optical signal coupling efficiency by 90 percent or more. For example, reflective structure 216 redirects optical signals that are diffracted by diffractive grating coupler 214 in an undesired direction, such as toward backside 210 of silicon photonic chip 200, back into the desired optical coupling direction, such as toward optical fiber connector 218 on front side 208. Thus, FIG. 2 illustrates an etched backside cavity with an embedded reflective structure within the silicon substrate of the silicon photonic chip to increase backside out of plane diffractive grating optical coupling efficiency.

With reference now to FIG. 3, a diagram of a cross-section view of a silicon photonic chip with integrated microlens optically coupled to an optical fiber connector with integrated microlens is depicted in accordance with an illustrative embodiment. Silicon photonic chip 300 may, for example, be silicon photonic chip 100 in FIG. 1. Silicon photonic chip 300 includes active silicon photonic layer 302, buried oxide layer 304, and silicon substrate 306, such as active silicon photonic layer 102, buried oxide layer 104, and silicon substrate 106 in FIG. 1. In addition, silicon photonic chip 300 includes reflective structure 320, such as reflective structure 124 in FIG. 1.

Active silicon photonic layer 302 is on front side 308 of silicon photonic chip 300. Active silicon photonic layer 302 includes silicon photonic devices, such as diffractive grating coupler 318, and may also include electronic devices. Diffractive grating coupler 318 may, for example, be diffractive grating coupler 122 in FIG. 1. Buried oxide layer 304 is buried between active silicon photonic layer 302 and silicon substrate 306. Silicon substrate 306 is on backside 310 of silicon photonic chip 300.

Further, silicon photonic chip 300 includes integrated microlens 312, such as integrated microlens 114 in FIG. 1. Integrated microlens 312 is located on backside 310 of silicon photonic chip 300 within an etched backside cavity, which is in alignment with diffractive grating coupler 318. Integrated microlens 312 optically couples silicon photonic chip 300 with optical fiber connector with integrated microlens and turning structure 314.

In this example of FIG. 3, optical signals exit integrated microlens 312 on backside 310 of silicon photonic chip 300. These optical signals exiting integrated microlens 312 are collimated and have a mode field diameter of approximately 100 micrometers. Optical fiber connector with integrated microlens and turning structure 314 turns these optical signals exiting integrated microlens 312 by 90 degrees and focuses these optical signals into optical fiber 316. It should be noted that instead of utilizing optical fiber 316, alternative illustrative embodiments may utilize a polymer waveguide cable. The optical signal turning structure within optical fiber connector with integrated microlens and turning structure 314 may, for example, be a 45-degree mirror. Optical fiber connector with integrated microlens and turning structure 314 and integrated microlens 312 provide a more relaxed lateral optical signal alignment tolerance of approximately 10-15 micrometers between optical fiber connector with integrated microlens and turning structure 314 and silicon photonic chip 300.

Also in this example of FIG. 3, silicon photonic chip 300 is flip-chip bonded to chip carrier 322 using conductive bumps 324. Active silicon photonic layer 302 of silicon photonic chip 300 faces chip carrier 322 where electrical connections are established between silicon photonic chip 300 and chip carrier 322 through conductive bumps 324. Conductive bumps 324 may, for example, be solder bumps, gold balls, molded studs, or electrically conductive plastics. This type of mounting is also known as the Controlled Collapse Chip Connection, or C4. In addition, this type of mounting leaves a small space between silicon photonic chip 300 and chip carrier 322. An electrically-insulating adhesive may, for example, be used to "under fill" this small space between silicon photonic chip 300 and chip carrier 322 to provide a stronger mechanical connection, provide a heat bridge, and to ensure that the conductive bumps are not stressed due to differential heating of silicon photonic chip 300 and chip carrier 322. Chip carrier 322 is a packaging substrate and may, for example, be a ceramic substrate or an organic substrate.

Figure 4:
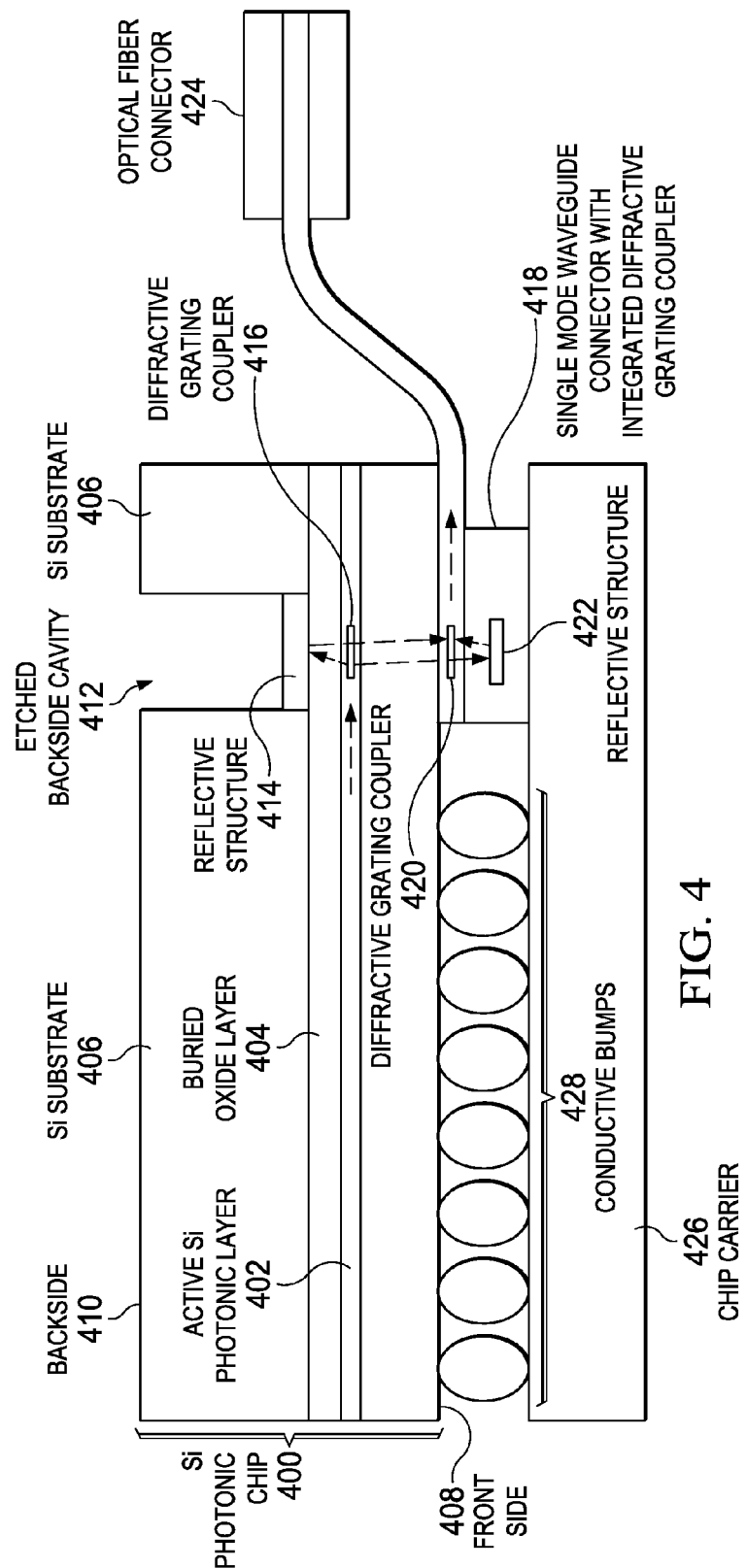
FIG. 4 is a diagram of a cross-section view of a silicon photonic chip with a reflective structure located in an etched backside cavity optically coupled to an optical fiber connector using a single mode waveguide connector with integrated diffractive grating coupler in accordance with an illustrative embodiment.

With reference now to FIG. 4, a diagram of a cross-section view of a silicon photonic chip with a reflective structure located in an etched backside cavity optically coupled to an optical fiber connector using a single mode waveguide connector with integrated diffractive grating coupler is depicted in accordance with an illustrative embodiment. Silicon photonic chip 400 is similar to silicon photonic chip 200 in FIG. 2. For example, silicon photonic chip 400 includes active silicon photonic layer 402, buried oxide layer 404, and silicon substrate 406, such as active silicon photonic layer 202, buried oxide layer 204, and silicon substrate 206 in FIG. 2.

Active silicon photonic layer 402 is on front side 408 of silicon photonic chip 400. Active silicon photonic layer 402 includes silicon photonic devices, such as diffractive grating coupler 416, and may also include electronic devices. Buried oxide layer 404 is buried between active silicon photonic layer 402 and silicon substrate 406. Silicon substrate 406 is on backside 410 of silicon photonic chip 400.

In addition, silicon photonic chip 400 includes etched backside cavity 412 and reflective structure 414, such as etched backside cavity 212 and reflective structure 216 in FIG. 2. Reflective structure 414 is located on backside 410 of silicon photonic chip 400 within etched backside cavity 412 adjacent to a backside surface of buried oxide layer 404.

Reflective structure 414 redirects optical signals that are diffracted by diffractive grating coupler 416 in an undesired direction, such as toward backside 410 of silicon photonic chip 400, back into the desired optical signal coupling direction, such as toward single mode waveguide connector with integrated diffractive grating coupler 418. Single mode waveguide connector with integrated diffractive grating coupler 418 is attached to front side 408 of silicon photonic chip 400 and includes diffractive grating coupler 420 and reflective structure 422. A single mode waveguide is an optical signal waveguide that transports only a single ray of light or mode. Because a single mode waveguide supports only one transverse mode, intermodal dispersion is eliminated. In addition, single mode waveguides have a smaller core size than multimode waveguides.

Single mode waveguide connector with integrated diffractive grating coupler 418 may, for example, be made of an optical polymer material, such as Norland Optical Adhesive #NOA 88 or #NOA 87, that includes a core and cladding. The core of single mode waveguide connector with integrated diffractive grating coupler 418 includes diffractive grating coupler 420. Cladding is one or more layers of lower optical refractive index material in contact with a core material of higher optical refractive index, which in this example includes diffractive grating coupler 420. The cladding material causes light to be confined to the silicon photonic core of single mode waveguide connector with integrated diffractive grating coupler 416 by internal reflection at the boundary between the cladding material and the silicon photonic core.

In this example of FIG. 4, diffractive grating couplers 416 and 420, which have large mode field diameters of approximately 100 micrometers, are used to relax the optical signal alignment tolerances between diffractive grating coupler 416 and diffractive grating coupler 420. In this example, a diffractive grating coupler with a large mode field diameter is used to direct the optical signals out of plane. Because of the large mode field diameter, the optical signal beam remains collimated between diffractive grating coupler 416 and diffractive grating coupler 420. Using large mode field diameter diffractive grating couplers, illustrative embodiments require a less precise lateral alignment between diffractive grating couplers 416 and 420. For example, using a 100 micrometer optical signal beam diameter, illustrative embodiments allow for lateral misalignment of up to 20 micrometers between the mating diffractive grating couplers (i.e., diffractive grating coupler 416 and diffractive grating coupler 420) without significant transmission loss in the optical signal.

Reflective structure 422 redirects optical signals that are diffracted by diffractive grating coupler 420 in an undesired direction, such as toward chip carrier 426, back into the desired optical signal coupling direction, such as toward single mode waveguide connector with integrated diffractive grating coupler 418. Single mode waveguide connector with integrated diffractive grating coupler 418 optically couples silicon photonic chip 400 to optical fiber connector 424. Another feature of the illustrative embodiment shown in FIG. 4 is that single mode waveguide connector with integrated diffractive grating coupler 418 is low profile and may be positioned on front side 408 of silicon photonic chip 400 between chip carrier 426 and silicon photonic chip 400 in the space created by conductive bumps 428. Chip carrier 426 and conductive bumps 428 may, for example, be chip carrier 322 and conductive bumps 324 in FIG. 3.

Thus, illustrative embodiments provide different apparatuses for the coupling of optical signals to and from a silicon photonic chip. The circuit as described above is part of the design for an integrated circuit chip. The chip design is created in a graphical computer programming language, and stored in a computer readable storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the computer readable storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the illustrative embodiments has been presented for purposes of illustration and description, and is not intended to be exhaustive or limited to the embodiments in the form disclosed. Many modifications and variations will be apparent to those of ordinary skill in the art. The embodiments were chosen and described in order to best explain the principles of the embodiments, the practical applications, and to enable others of ordinary skill in the art to understand the various embodiments with various modifications as are suited to the particular use contemplated.

What is claimed is:

1. A silicon photonic chip, the silicon photonic chip comprising:
   an active silicon layer that includes a photonic device, wherein the active silicon layer is on a front side of the silicon photonic chip;
   a silicon substrate that includes an etched backside cavity, wherein the silicon substrate is on a backside of the silicon photonic chip;
   a microlens integrated into the etched backside cavity, wherein the microlens collimates optical signals from the silicon photonic chip to an optical fiber connector having an integrated microlens positioned on the backside of the silicon photonic chip; and
   a buried oxide layer located between the active silicon layer and the silicon substrate, wherein the buried oxide layer is an etch stop for the etched backside cavity.

2. The silicon photonic chip of claim 1, further comprising:
a reflective structure located on the front side of the silicon photonic chip, wherein the photonic device is located between the etched backside cavity and the reflective structure.

3. The silicon photonic chip of claim 1, wherein the photonic device is a diffractive grating coupler that diffracts optical signals to and from the active silicon layer.

4. The silicon photonic chip of claim 1, wherein the microlens is an optical polymer material that is curable by ultraviolet light, and wherein the optical polymer material is molded into the microlens during a fabrication process of the silicon photonic chip using a transparent, lens-shaped mold.

5. The silicon photonic chip of claim 1, wherein the microlens is recessed within the etched backside cavity to protect the microlens from damage.

6. The silicon photonic chip of claim 1, wherein the microlens and the optical fiber connector having the integrated microlens provides an optical signal misalignment tolerance of 10-15 micrometers between the microlens and the optical fiber connector having the integrated microlens.

7. The silicon photonic chip of claim 1, wherein the etched backside cavity is one of a plurality of etched backside cavities with integrated microlenses in the silicon substrate, and wherein each of the plurality of etched backside cavities is cylindrical in shape.

8. The silicon photonic chip of claim 4, wherein the microlens is optically aligned with the photonic device during a fabrication process of the silicon photonic chip using an optical alignment device that looks through the transparent, lens-shaped mold.

9. The silicon photonic chip of claim 8, wherein an optical misalignment tolerance between the microlens and the photonic device is less than one micrometer.

10. The silicon photonic chip of claim 2, wherein the reflective structure reflects optical signals diffracted toward the front side of the silicon photonic chip to the microlens located on the backside of the silicon photonic chip.

11. A silicon photonic chip, the silicon photonic chip comprising:
an active silicon layer that includes a photonic device, wherein the active silicon layer is on a front side of the silicon photonic chip;
a silicon substrate that includes an etched backside cavity, wherein the silicon substrate is on a backside of the silicon photonic chip; and
a reflective structure located in the etched backside cavity adjacent to a backside surface of a buried oxide layer that is located between the active silicon layer and the silicon substrate.

12. The silicon photonic chip of claim 11, wherein the etched backside cavity is aligned with the photonic device.

13. The silicon photonic chip of claim 11, wherein the photonic device is located between the reflective structure in the etched backside cavity and an optical fiber connector positioned on the front side of the silicon photonic chip.

14. The silicon photonic chip of claim 13, wherein the reflective structure reflects optical signals diffracted toward a backside of the silicon photonic chip to the optical fiber connector positioned on the front side of the silicon photonic chip.

15. The silicon photonic chip of claim 11, wherein the reflective structure is one of a mirror or a thin metal film.

16. The silicon photonic chip of claim 11, wherein a silicon dioxide material is located in the etched backside cavity on a backside of the reflective structure.

17. A silicon photonic chip, the silicon photonic chip comprising:
an active silicon layer that includes a photonic device, wherein the active silicon layer is on a front side of the silicon photonic chip;
a silicon substrate that includes an etched backside cavity, wherein the silicon substrate is on a backside of the silicon photonic chip;
a microlens integrated into the etched backside cavity, wherein the microlens collimates optical signals from the silicon photonic chip to an optical fiber connector having an integrated microlens positioned on the backside of the silicon photonic chip;
a buried oxide layer located between the active silicon layer and the silicon substrate, wherein the buried oxide layer is an etch stop for the etched backside cavity; and
a reflective structure located on the front side of the silicon photonic chip, wherein the photonic device is located between the etched backside cavity and the reflective structure.

18. The silicon photonic chip of claim 17, wherein the microlens is recessed within the etched backside cavity to protect the microlens from damage.

19. The silicon photonic chip of claim 17, wherein the optical fiber connector having the integrated microlens includes a 45 degree optical signal reflective turning structure that turns an optical signal 90 degrees to and from an optical fiber that is positioned parallel with the silicon photonic chip.

20. A silicon photonic chip, the silicon photonic chip comprising:
an active silicon layer that includes a photonic device, wherein the active silicon layer is on a front side of the silicon photonic chip;
a silicon substrate that includes an etched backside cavity, wherein the silicon substrate is on a backside of the silicon photonic chip;
a first reflective structure located in the etched backside cavity adjacent to a backside surface of a buried oxide layer located between the active silicon layer and the silicon substrate; and
a single mode waveguide connector having an integrated photonic device located on the front side of the silicon photonic chip opposite the etched backside cavity, wherein the single mode waveguide connector having the integrated photonic device is located in a space created by a conductive bump layer between the silicon photonic chip and a chip carrier.

21. The silicon photonic chip of claim 20, wherein the single mode waveguide connector having the integrated photonic device includes a second reflective structure.

22. The silicon photonic chip of claim 21, wherein the single mode waveguide connector having the integrated photonic device optically couples the silicon photonic chip to an optical fiber connector.

23. The silicon photonic chip of claim 21, wherein the single mode waveguide connector having the integrated photonic device is an optical polymer material with a core of higher optical refractive index material and an outer layer of cladding consisting of one or more layers of lower refractive index material.

* * * * *